United States Patent [19]

Hoendervoogt et al.

[11] Patent Number: 5,045,645
[45] Date of Patent: Sep. 3, 1991

[54] DIGITIZER SYSTEM WITH PASSIVE POINTER

[75] Inventors: Jason Hoendervoogt; Brian Abernethy, both of Phoenix, Ariz.

[73] Assignee: CalComp Inc., Anaheim, Calif.

[21] Appl. No.: 527,027

[22] Filed: May 22, 1990

[51] Int. Cl.⁵ .............................................. G08C 21/00
[52] U.S. Cl. ...................................................... 178/19
[58] Field of Search ...................................... 178/19, 18

[56] References Cited

U.S. PATENT DOCUMENTS

| | | | |
|---|---|---|---|
| 3,689,885 | 9/1972 | Kaplan et al. | 340/152 T |
| 4,023,167 | 5/1977 | Wahlstrom | 343/6.5 SS |
| 4,423,286 | 12/1983 | Bergeron | 178/19 |
| 4,697,050 | 9/1987 | Farel et al. | 178/19 |
| 4,704,501 | 11/1987 | Taguchi et al. | 178/19 |
| 4,734,546 | 3/1988 | Landmeier | 178/19 |
| 4,786,765 | 11/1988 | Yamanami et al. | 178/19 |
| 4,878,553 | 11/1989 | Yamanami et al. | 178/18 |
| 4,902,858 | 2/1990 | Yamanami et al. | 178/19 |

Primary Examiner—Stafford D. Schreyer
Attorney, Agent, or Firm—Cesari & McKenna

[57] ABSTRACT

A driving grid is driven by an ac signal comprising a carrier frequency modulated by a lower frequency. An untethered, batteryless pointer includes a pick-up coil in a first tuned circuit tuned to the carrier frequency, connected by diodes to a driving coil in a second tuned circuit tuned to the lower modulating frequency. Energy picked up by the first tuned circuit from the driving grid at the carrier frequency drives the second tuned circuit at the modulating frequency. Modulating frequency signals induced in the receiving grid conductors are used to locate the pointer in the usual manner. Because the carrier signal contains no frequency component of the modulating signal, the driving grid and receiving grid are sufficiently decoupled.

28 Claims, 4 Drawing Sheets

DIGITIZER SYSTEM WITH PASSIVE POINTER

FIELD OF THE INVENTION

This invention relates to graphic digitizers, that is, systems for translating the physical position of a pointer relative to a grid of spaced conductors into electrical signals for use by a utilization device. More particularly, it relates to a digitizer system having a passive pointer, i.e., one that requires neither a connecting cord nor a battery.

BACKGROUND

Digitizers, as known in the art, are very useful for translating the position of a point on a plan or drawing into coordinates recognizable by a computer. In the latter form, the computer can make use of the position information in any number of useful ways. Unlike the position information from a mouse, which is always relative to its immediately previous position on a support surface, the digitizer position information is relative to a grid of conductors incorporated into its work surface. It becomes, therefore, absolute with respect to the work surface and any plan or drawing mounted thereon in a designated orientation. As a result, the position information is accurate enough not only to edit graphic displays, but also to control manufacturing processes according to scale drawings placed on the work surface, and to control navigation of air and water craft according to charts.

A number of well known digitizer systems make use of a movable coil and a work surface defined by a receiving grid of conductors. The coil may be disposed within the tip of a pen-shaped instrument so that the pen point accurately locates the effective coil center. Alternatively, the coil may surround a transparent disc with a set of cross hairs etched thereon to mark the coil center in what is known as a cursor. The receiving grid normally comprises a set of parallel conductors uniformly spaced along the work surface in what may be called the x direction and another set similarly disposed along the work surface in the orthogonal y direction. An oscillator applies an ac signal of predetermined frequency and amplitude to the coil, which is inductively coupled to the conductors of the grid.

In accordance with well known principles of electromagnetic theory, ac electrical signals are induced in the grid conductors at a magnitude and phase that depend on the location of the coil relative to the conductors. Generally, the signals induced in the conductors will have a magnitude that varies from zero at the coil center to a maximum at the coil periphery and tapering off beyond. Further, the phase of the signals induced in conductors at one side of the coil will be the opposite of (180 degrees displaced from) that of signals induced in conductors at the other side.

The conductors in each set are accessed in a predetermined order through the use of multiplexer circuitry to couple the induced signals to detection circuitry. By identifying the two adjacent conductors in each set in which the induced signals are of opposite phase, the detection circuitry coarsely locates the pointer between them. The exact position of the pointer between the indicated conductors may then be determined by the relative magnitudes of induced signal in the adjacent conductors.

One disadvantage of these known systems arises from the necessity of supplying sufficient power to the coil in the pointer. Normally, a cable connects the ac signal to the coil, tethering the pointer to the base electronics associated with the work surface. Additional wires in the cable connected to switches on the pointer allow the operator to supply additional information to the base electronics. For example, the information that the coil is at a point where coordinates are desired can be so signalled. Such cables, however, restrict free movement of the pointer across the digitizer work surface. Alternatively, the oscillator may be located in the pointer together with a battery for power. In this case, the switches on the pointer can cause phase shifts in the oscillator signal that will be recognized by the base electronics. Such batteries, however, tend to be heavy and bulky, or else expensive and short-lived.

A digitizing system that requires neither cable nor battery is disclosed in U.S. Pat. No. 4,878,553 which issued on Nov. 7, 1989 to T. Yamanami et al. According to the disclosure of that patent, an ac signal is first applied to a selected receiving grid conductor. A tuned circuit comprising a coil and a capacitor located in the pointer is inductively excited by the ac signal on the selected conductor to resonate at the same frequency. The ac signal is then removed from the selected conductor, and, after a sufficient time interval for confusing transients and clutter to subside, the conductor is connected to detection circuitry. The tuned circuit in the pointer continues to ring, and it serves as the ac source for detection as in the prior art. While this disclosed system dispenses with the unwanted cable and battery, it has other disadvantages. Since each selected conductor must first be excited directly by the oscillator and then inductively by the ringing tuned circuit, the time taken to process each conductor is relatively long. This significantly slows down the rate at which positions can be determined. Furthermore, as soon as the ac signal is disconnected from the selected conductor, and therefore during the whole time the detector is making its measurements, the amplitude of the coil signal decays at an exponential rate. This can introduce inaccuracies into the position determination process.

An object of our invention is to provide a digitizer system having an untethered passive pointer that can make use of a full-time driving signal.

SUMMARY OF THE INVENTION

A digitizer system embodied in accordance with the present invention utilizes a composite driving signal that comprises first and second frequency components. A movable pointer comprises a first tuned circuit, inductively coupled to the composite driving signal and responsive to the first frequency component, and a second tuned circuit responsive to the second frequency component of the composite driving signal and inductively coupled to a grid of spaced conductors. The signals coupled in selected conductors of the grid are detected to determine the location of the pointer relative to the conductors.

The composite driving signal may comprise a carrier frequency, $f_1$, modulated by a lower frequency, $f_2$. A pickup coil in the pointer, inductively coupled to the driving signal, may be part of the first tuned circuit tuned to resonate substantially at frequency $f_1$. A driving coil in the pointer, inductively coupled to the receiving grid, may be part of the second tuned circuit tuned to resonate substantially at frequency $f_2$. Diode means may be connected between the two tuned circuits to couple energy from the first tuned circuit to drive the second tuned circuit and the driving coil. The composite driving signal may be applied to selected conductors of a separate driving grid. Alternatively, the driving signal may be applied to selected receiving grid conductors of the set spaced in the y direction while the digitizer is determining the location of the pointer along the x direction, and vice versa.

DRAWING DESCRIPTION

The foregoing and other features and advantages of this invention will be better understood from the following detailed description taken with the accompanying drawings in which.

DETAILED DESCRIPTION

Figure 1:
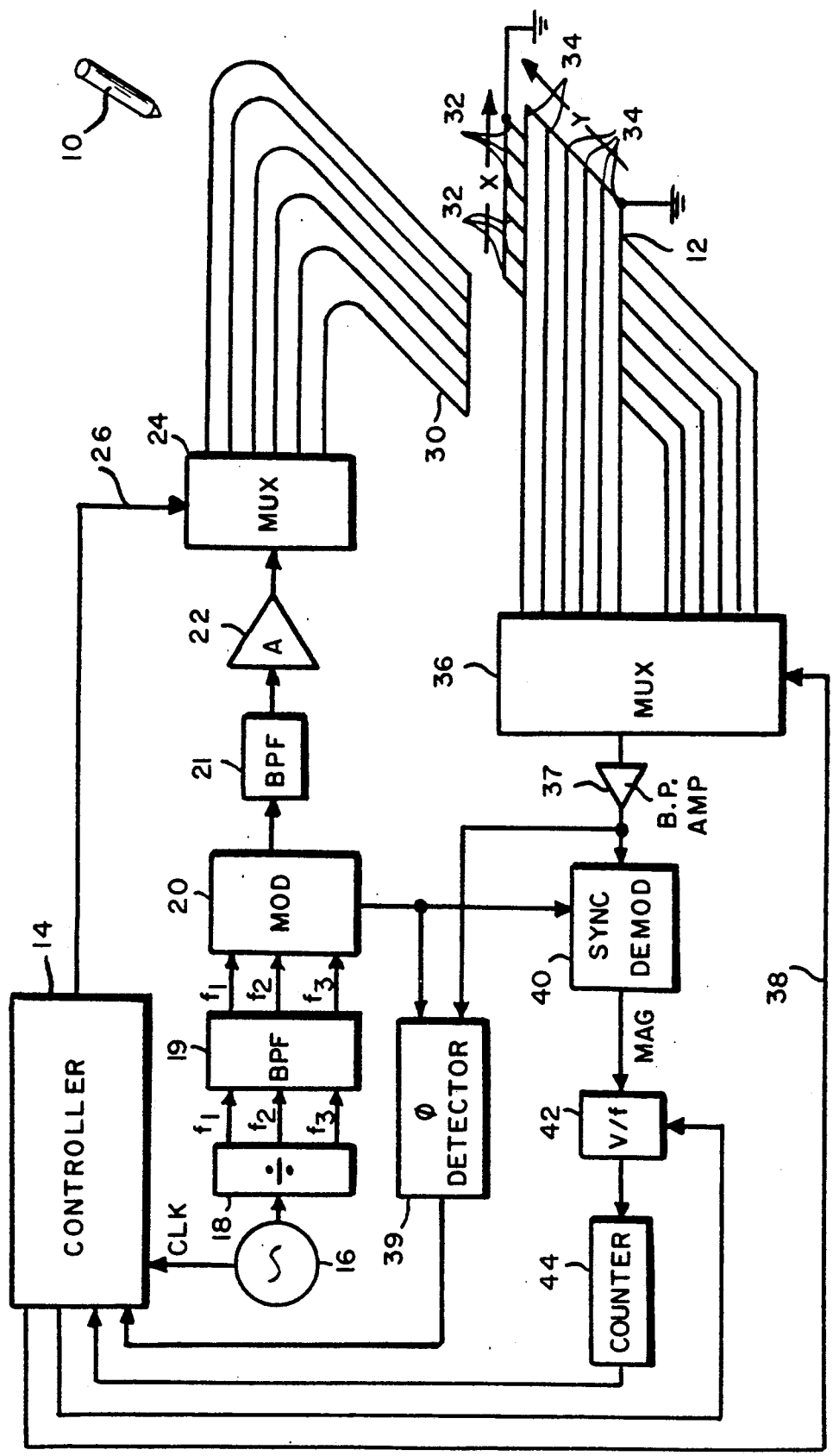
FIG. 1 is a block diagram of a particularly useful embodiment of the invention.

In an exemplary embodiment of the invention, shown in block form in FIG. 1, the position of an untethered and passive pointer 10, in relation to a receiving grid 12 is determined by a process under the control of a controller 14. An oscillator 16 is connected to controller 14 to provide clock signals thereto, and to a frequency divider 18. Divider 18 may have three outputs connected via bandpass filtering apparatus 19 to a modulator 20. The output of the modulator may be connected through a bandpass filter 21 and an amplifier 22 to the signal input of a switching multiplexer 24. Multiplexer 24 may have an address input connected to controller 14 via an address bus 26 and a series of outputs 28 connected to individual conductors of a driving grid 30. Receiving grid 12 may advantageously have a series of parallel conductors 32 distributed in an x-direction and a series of parallel conductors 34 distributed in a y-direction, orthogonal to the x-direction. Conductors 32 and 34 are connected to individual inputs of a switching multiplexer 36. An address bus 38 connects controller 14 to the address inputs of multiplexer 36. The output of receiving multiplexer 36 may be connected via a bandpass amplifier 37 to one input of a phase detector 39 and to one input of a synchronous demodulator 40. A second input of detector 39 and a second input of demodulator 40 are connected to modulator 20. The output of phase detector 39 may be connected to controller 14. The output of demodulator 40 may be connected to the signal input of a voltage-to-frequency converter 42, which may have a control input connected to controller 14. Finally, the output of converter 42 may be connected to a counter 44 to produce a numerical output, which is fed back to controller 14.

Figure 3A:
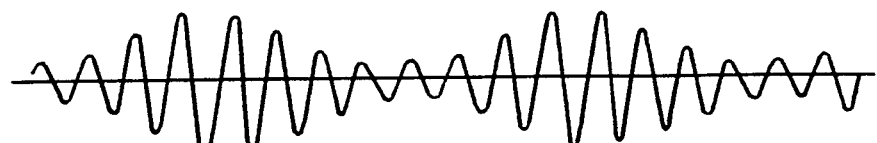
FIGS. 3A through 3F are a series of waveforms useful in explaining the operation of the invention.

The operation of the circuit of FIG. 1 may be described as follows. The signal from clock oscillator 16 may be divided by two separate numbers in divider 18 to produce a high frequency $f_1$, and a much lower frequency $f_2$. The third frequency $f_3$ output from divider 18 is not needed in all embodiments and will be referred to later. The two frequencies may be bandpass filtered and modulated together. The resulting classical amplitude modulated (AM) signal is shown in FIG. 3A, in which $f_1$ is the carrier frequency and $f_2$ the envelope frequency.

The modulated signal is filtered to eliminate the $f_2$ component, amplified to an appropriate level and applied to the signal input of multiplexer 24. Controller 14, by sending specific addresses over bus 26, selects which conductors of driving grid 30 receive the modulated signal.

Figure 2:
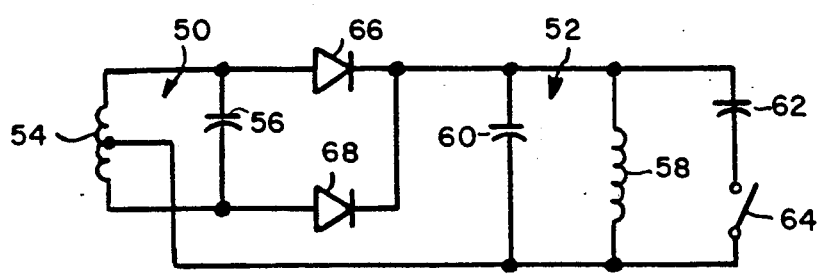
FIG. 2 is a circuit diagram of a pointer circuit useful in practicing the invention.

Pointer 10, according to the principles of our invention, is particularly adapted to make use of the modulated driving signal. The electrical circuit of pointer 10, as shown in FIG. 2, includes a first tuned circuit 50 and a second tuned circuit 52. Circuit 50 may include a coil 54 and a parallel capacitor 56. The combination is tuned to resonate at the carrier frequency, $f_1$. Tuned circuit 52 may include the parallel combination of a coil 58 and a capacitor 60. A pair of diodes 66 and 68 may connect respective ends of coil 54 with one end of coil 52; the center of coil 54 is connected to the other end of coil 52.

Figure 3B:
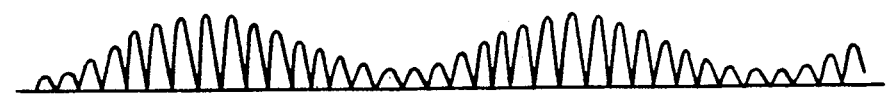
Figure 3C:

Circuit 50 is tuned to pick up the maximum energy at frequency $f_1$ from the modulated signal that is applied selectively to conductors of driving grid 30. It therefore mimics the waveform of FIG. 3A. The diodes provide full wave rectification of the signal to produce the waveform of FIG. 3B. Alternatively, a single diode could be used to provide half wave rectification in the manner of typical AM signal detection. The full wave version is preferred here to maximize the power transfer. Tuned circuit 52 is tuned to resonate at frequency $f_2$. Since this is the modulating envelope frequency of the signal induced in circuit 50 and applied to circuit 52 through the full wave rectifying diodes 66 and 68, it produces a strong signal in circuit 52, as shown in FIG. 3C, for inductive coupling to the conductors of receiving grid 12.

The remainder of the circuit of the embodiment of FIG. 1 may be any of a number of known digitizer detecting circuits. The detection circuitry shown, with the exception of phase detector 39, is similar to that described in U.S. Pat. No. 4,734,546 to Waldo L. Landmeier, the disclosure of which is incorporated herein by reference. An individual x conductor of the receive grid 12 is connected to amplifier 37 by multiplexer 36 as addressed over bus 38 by controller 14. The bandpass amplifier provides the proper operating signal levels for the system and filters out noise and other unwanted signal components. The output of amplifier circuit 37 is applied to synchronous demodulator 40, which converts the ac signal to a dc signal. The dc signal has an amplitude that is proportional to the amplitude of the ac signal applied to the input of amplifier 37 and a polarity that corresponds to that signal's phase.

The output of synchronous demodulator 40 is applied to an analog-to-digital converter. One such effective A/D converter comprises voltage-to-frequency converter 42 and counter 44. The converter 42 converts the dc signal out of demodulator 40 into a variable frequency signal, the frequency of which deviates from a zero-signal frequency by an amount proportional to the dc signal's magnitude and in a direction corresponding to its polarity. Counter 44 counts cycles of the variable frequency signal over a fixed period of time to produce and report to controller 14 a digital number that, when subtracted from the zero-signal count, reflects the magnitude and phase of the ac signal induced in the selected x conductor of receiving grid 12. The phase of the signal detected on the selected x conductor indicates whether the pointer 10 is to the right or to the left of the selected conductor. Another x conductor is then selected and the voltage and phase of the induced signal on it are determined. Additional samplings are taken in the same fashion until the controller 14 ascertains that the pointer 10 is located between two adjacent x conductors (i.e., the phase of the signal on one of the adjacent conductors is 180° displaced from the phase of the signal on the other adjacent conductor). The digital numbers that represent the amplitude values of voltage detected on these two adjacent conductors are then used in a ratio to determine the precise location of the pointer between the adjacent conductors. The pointer location with respect to the y conductors may then be determined in a similar fashion, with the modulated driving signal still energizing the same driving grid conductor.

Figure 3D:

Modulator 20 need not necessarily be a sine wave modulator, nor produce the classic AM modulation waveform shown in FIG. 3A. In fact, modulator 20 may be a simple AND gate with $f_1$ and $f_2$ inputs. It will then generate the equally satisfactory driving waveform shown in FIG. 3D by merely gating frequency $f_1$ on and off at the $f_2$ rate.

Figure 3E:
Figure 3F:
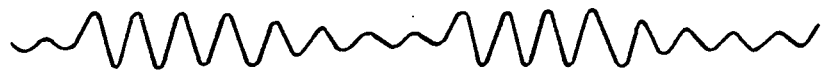

In an additional alternative arrangement, divider 18 produces a third frequency output $f_3$. Modulator 20 switches at the $f_2$ rate between two higher frequencies, $f_1$ and $f_3$, to generate the signal shown in FIG. 3E. A suitable gating arrangement to produce this frequency shifted FM driving signal can easily be chosen by a designer of ordinary skill. In this case, pick-up tuned circuit 50 of the pointer will respond with a waveform similar to that shown in FIG. 3F. This driving waveform has an advantage over that of FIG. 3D in that it tends to speed up the reaction of driving tuned circuit 52 to produce a higher output.

With each of these driving signals, in order to avoid unwanted coupling directly from the driving grid to the receiving grid, by-passing the pointer, frequency $f_2$ should not appear in the spectrum of the driving signal. As is well known in the art, this may require bandpass filtering and substantial attention to the linearity of the amplifier. A high frequency $f_1$ of 2.7 MHz modulated by a low frequency $f_2$ of 230 KHz make a usable AM signal for driving the digitizer of this invention. In the three frequency approach, the frequency $f_3$ may be 1800 KHz.

Figure 4:
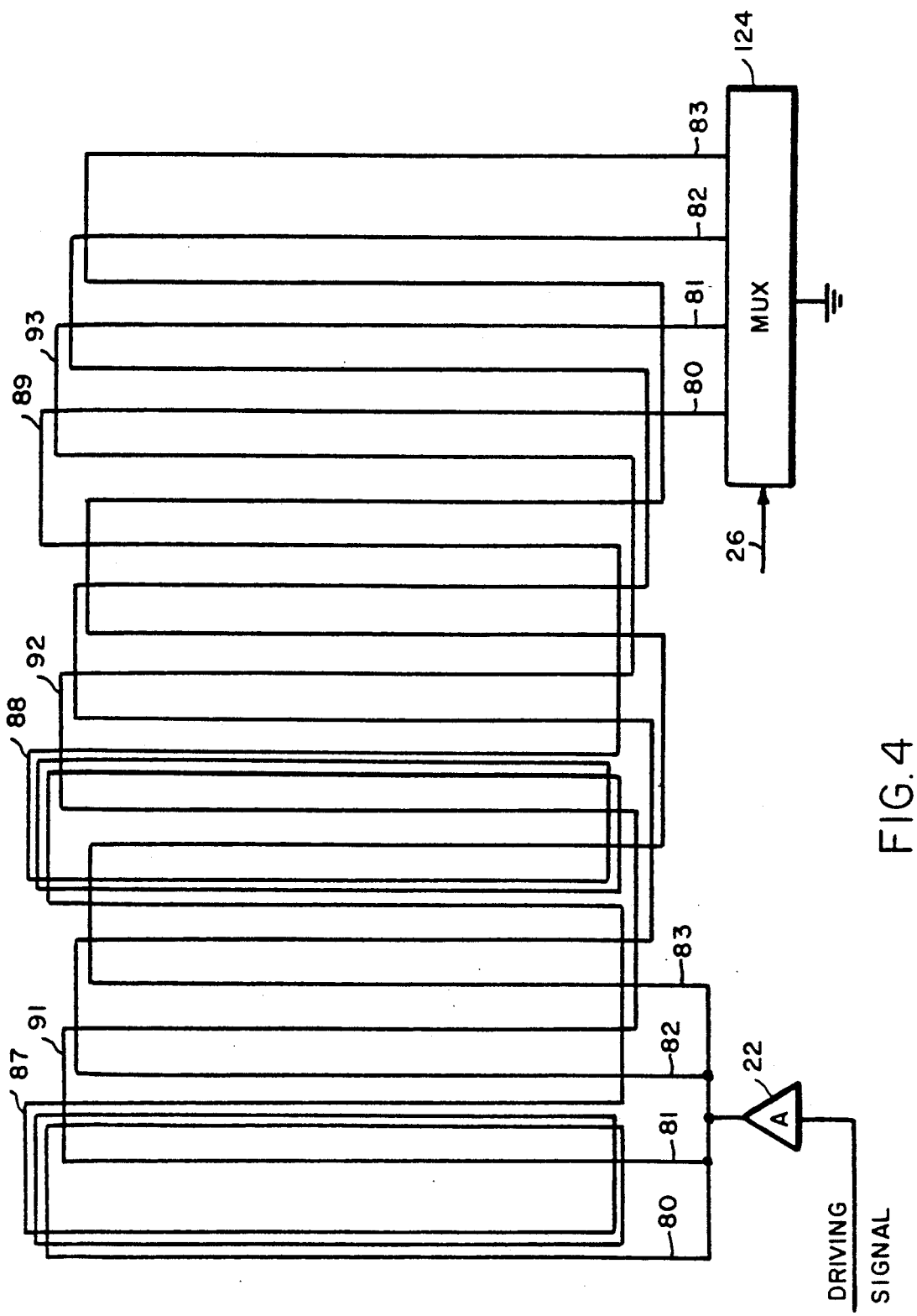
FIG. 4 is a pictorial diagram of a driving grid arrangement useful in practicing the invention.

Because of the relatively high driving signal currents needed in order to generate sufficient energy in driving coil 58, switching multiplexer 24 can be expensive. An arrangement for driving grid 3 that requires fewer driving grid conductors and less driving current, thus allowing a less costly switching multiplexer, is shown in diagrammatical form in FIG. 4. In this arrangement, each driving grid conductor, 80-83 forms several driving grid coils spaced along the digitizer work surface. Conductor 80, for example, forms coils 87, 88 and 89. It will be understood that each of the coils may be a multiturn coil, although, in order to keep the drawing readable, only coils 87 and 88 are drawn with multiple turns. It will also be understood that the number of turns may be many more than the two turns shown, as dictated by the needs of the circuit. Conductor 81, therefore, forms coils 91, 92 and 93. In like manner, the remaining conductors each form spaced coils that overlap coils formed by other conductors. With this arrangement, as few as four conductors can form, for example, twelve driving grid coils to cover a twenty-four inch work surface. Switching multiplexer 124 can therefore be a simple combination logic gating arrangement controlled by a two wire bus 26. Circuit designers can choose the number of turns per coil, the number of coils per conductor and the number of conductors that best suit their needs.

We have found that with this driving grid arrangement, when any one of the driving grid conductors is energized with the modulated driving signal according to the invention, enough energy can be picked up in the pointer and transferred to the receiving grid to coarsely locate the pointer. Controller 14, using the coarse location information, can then send the proper address to multiplexer 124 to maximize the driving signal at the pointer. The receiving circuitry can thereafter determine the exact pointer location most effectively. There is, of course, no need to change the selected driving grid conductor for the subsequent location determination with respect to the receiving y grid.

Figure 5:
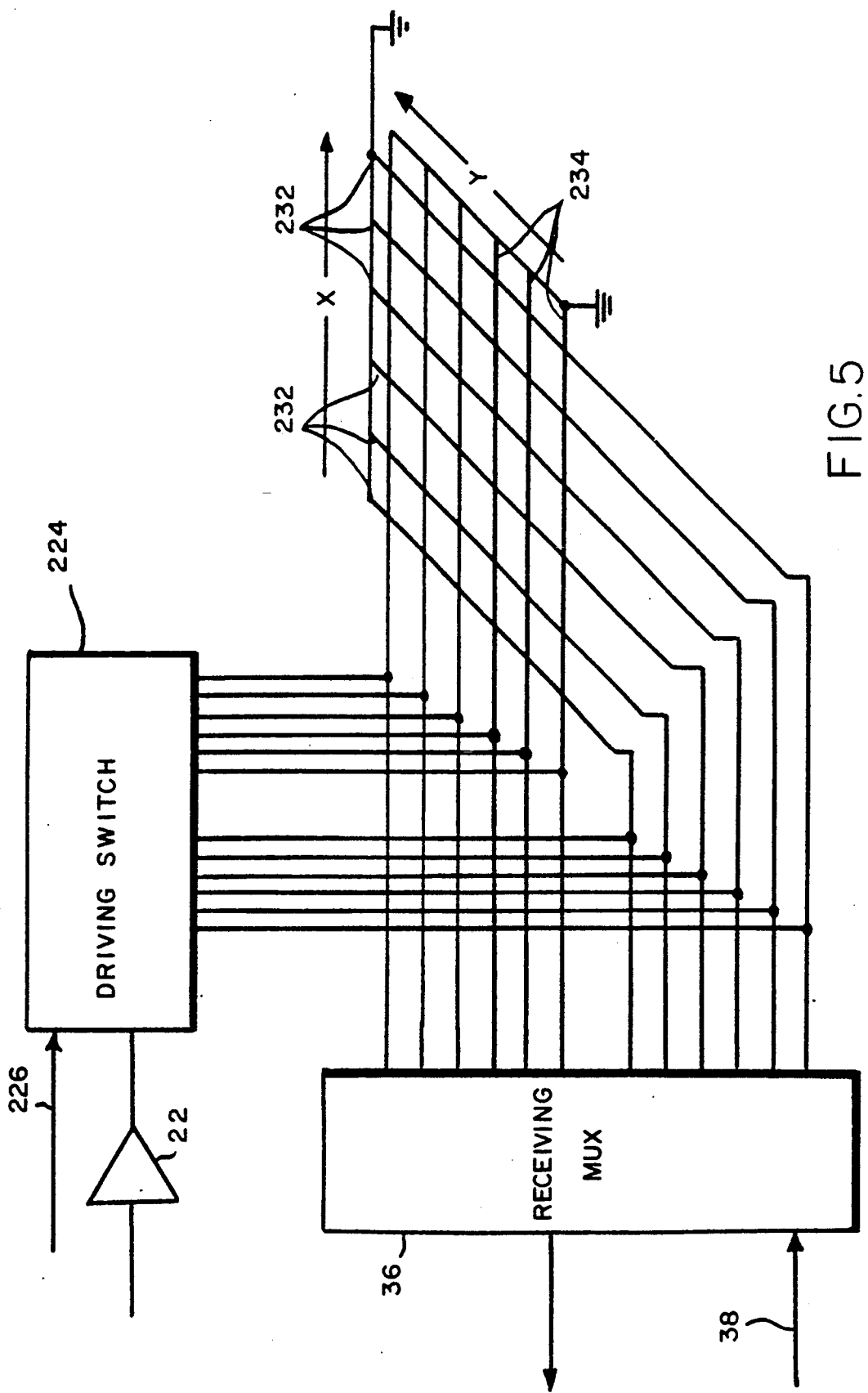
FIG. 5 is a block diagram showing an alternative arrangement in place of the separate driving grid shown in FIG. 1.

Another arrangement for the driving grid is shown in FIG. 5. According to this arrangement, no separate driving grid is needed; the idle one of the x and y receiving grids is driven by the modulated driving signal. Multiplexer 24 is therefore replaced by a driving switch 224 that can connect the driving signal from amplifier 22 to any one of the conductors 232 of the x receiving grid or any one the conductors 234 of the y receiving grid. The selection is made by controller 14 over bus 226. To locate the pointer with respect to the x conductors, the y conductors are sequentially driven by the modulated driving signal, and the y conductor that produces the maximum response in the receiving circuitry is selected as the driving conductor. Since the x and y conductors are orthogonal, the optimum driving grid conductor will be the same for all selected receiving conductors. The receiving x conductors are then sequentially connected to the receiving circuitry in the usual manner to determine the pointer position relative thereto. In the subsequent process of determining the pointer position relative to the y conductors, there is no need to scan the x conductors with the driving signal for a maximum response. The x conductor nearest the pointer is already known and may be selected by controller 14.

To limit the undesirable coupling directly between the x and y grids when this driving arrangement is used, it is useful to expand the usual 0.003 to 0.004 inch spacing between their planes to 0.025 to 0.030 inches.

Additional reactive circuits may be connected into tuned circuit 52 by individual switches, as indicated by capacitor 62 and switch 64 in FIG. 2. Since circuit 52 is driven by the detected envelope of the modulated driving signal, the added reactance has little effect on the frequency at which the circuit operates. It does, however, produce an immediate phase shift, which can be detected and reported to controller 14 by a phase detector circuit 39 connected as shown in FIG. 1. Such switch-induced phase shifts and the range of phase detector can be limited to relatively small values. Controller 14 then can ignore positional information received during a switch-induced phase shift. Such phase shifts can therefore provide the signaling function of the hard wired switches of the tethered pointers in the prior art.

We have thus described a novel digitizer arrangement having a pointer that requires neither a connecting cable nor an energizing battery, but which allows full time application of the driving signal for improved performance. Other arrangements, including, for example, other driving or receiving grid configurations and other detecting arrangements will occur to those skilled in the art which do not depart from the scope and spirit of our invention, as defined by the appended claims.

What is claimed is:

1. A graphic digitizer comprising:
signal generating means for generating a composite driving signal having first and second frequency components;
a grid of spaced conductors;
movable pointer means inductively coupled to said signal generating means and to said conductors, said pointer means comprising a first tuned circuit responsive to the first frequency component of the composite driving signal and a second tuned circuit responsive to the second frequency component of the composite driving signal; and
means for detecting signals inductively coupled in selected ones of said conductors by said second tuned circuit to determine the location of the said pointer means relative to said conductors.

2. A graphic digitizer as in claim 1 wherein the first frequency component of the composite driving signal comprises a carrier signal of frequency $f_1$, and wherein the second frequency component of the composite driving signal comprises a modulating signal of frequency $f_2$, lower than $f_1$.

3. A graphic digitizer as in claim 2 wherein said first tuned circuit is tuned to resonate substantially at frequency $f_1$ and wherein said second tuned circuit is tuned to resonate substantially at frequency $f_2$.

4. A graphic digitizer as in claim 2 wherein the composite driving signal is amplitude modulated.

5. A graphic digitizer as in claim 2 wherein the composite driving signal comprises bursts of the frequency $f_1$ recurring at the frequency $f_2$.

6. A graphic digitizer as in claim 2 wherein the composite driving signal includes a third frequency component of frequency $f_3$, between the frequencies $f_1$ and $f_2$, the composite driving signal alternating between the frequencies $f_1$ and $f_3$ at the frequency $f_2$.

7. A graphic digitizer as in claim 1 wherein said pointer means further includes means for coupling energy to said second tuned circuit from said first tuned circuit.

8. A graphic digitizer as in claim 7 wherein said energy coupling means comprises diode means interposed between said first tuned circuit and said second tuned circuit.

9. A graphic digitizer as in claim 1 wherein said first tuned circuit includes a pick-up coil inductively coupled to the composite driving signal, and said second tuned circuit includes a driving coil inductively coupled to said grid of conductors.

10. A graphic digitizer as in claim 1 wherein said pointer means further comprises reactance means selectively includable in said second tuned circuit to produce a phase shift in the signals coupled to said conductors, said phase shift being detectable by said detecting means.

11. A graphic digitizer as in claim 10 wherein the phase shift produced by said reactance means is less than ninety degrees.

12. A graphic digitizer as in claim 1 further comprising:
a driving grid of spaced conductors, and
driving grid switching means connected between said signal generating means and said driving grid for connecting said composite driving signal to selected driving grid conductors to couple said driving signal to said pointer means.

13. A graphic digitizer as in claim 12 wherein at least one of said driving grid conductors comprises a plurality of spaced coils.

14. A graphic digitizer as in claim 13 wherein said spaced coils each comprise a plurality of turns.

15. A graphic digitizer as in claim 12 wherein said driving grid conductors each comprise a coil having a plurality of turns.

16. A graphic digitizer as in claim 15 wherein the coil of a said driving grid conductor overlaps the coil of adjacent driving grid conductors.

17. A graphic digitizer comprising:
signal generating means for generating an ac driving signal, said signal generating means comprising
a frequency source for producing a carrier frequency $f_1$, and a modulating frequency $f_2$, lower than $f_1$, and
modulating means connected to said frequency source for modulating said carrier frequency $f_1$ by said frequency $f_2$ to produce said ac driving signal;
a receiving grid of spaced conductors;
a movable pointer including coil means coupled to said signal generating means and said receiving grid for inducing receiving signals in said receiving grid conductors in response to said driving signal, said coil means comprising:
a first tuned circuit having a pick-up coil inductively coupled to said driving signal and being tuned to resonate substantially at frequency $f_1$;
a second tuned circuit having a driving coil inductively coupled to said receiving grid and being tuned to resonate substantially at frequency $f_2$; and
diode means connected between said first and second tuned circuits to provide energy to said second tuned circuit from said first tuned circuit;
receiving grid switching means connected to said receiving grid for connecting selected individual receiving grid conductors to the receiving grid switching means output; and
detecting means connected to said switching means output for comparing the receiving signals on said selected conductors and determining the location of said pointer in response to said comparison.

18. A graphic digitizer as in claim 17 wherein said ac driving signal produced by said modulating means is amplitude modulated.

19. A graphic digitizer as in claim 17 wherein said ac driving signal produced by said modulator comprises bursts of the frequency $f_1$ recurring at the frequency $f_2$.

20. A graphic digitizer as in claim 17 wherein said signal generating means further comprises a third frequency source of frequency $f_3$, between frequencies $f_1$ and $f_2$, connected to said modulating means; and
said ac driving signal alternates between frequencies $f_1$ and $f_3$ at frequency $f_2$.

21. A graphic digitizer as in claim 17 further comprising filter means connected to said modulating means to substantially eliminate frequency $f_2$ from said ac driving signal.

22. A graphic digitizer as in claim 17 further comprising:
a driving grid of spaced conductors, and
driving grid switching means connected between said modulating means and said driving grid for connecting said ac driving signal to selected driving grid conductors to inductively couple said ac driving signal to said pick-up coil.

23. A graphic digitizer as in claim 22 wherein said driving grid conductors each comprise a plurality of spaced coils.

24. A graphic digitizer as in claim 23 wherein said spaced coils each comprise a plurality of turns.

25. A graphic digitizer as in claim 23 wherein the coils of a said driving grid conductor overlap the coils of adjacent driving grid conductors.

26. A graphic digitizer as in claim 17 wherein said coil means further comprises reactance means selectively includable in said second tuned circuit to produce a phase shift in said receiving signals, said phase shift being detectable by said detecting means.

27. A graphic digitizer as in claim 26 wherein the phase shift produced by said reactance means is less than ninety degrees.

28. A graphic digitizer as in claim 17 wherein said receiving grid comprises a first set of conductors spaced along a first direction, x, and a second set of conductors spaced along a second direction, y, orthogonal to x; and said digitizer further comprises driving grid switching means connected to said modulating means and said second conductor set for connecting said ac driving signal to selected conductors of said second set to inductively couple said driving signal to said pick-up coil when said receiving grid switching means connects conductors of said first set to said detection means for determining the location of said pointer in said x direction.

* * * * *